(12) United States Patent
Giesner et al.

(10) Patent No.: US 9,942,381 B2
(45) Date of Patent: Apr. 10, 2018

(54) METHOD AND SYSTEM FOR SELECTING A COMMUNICATION STATUS FOR AT LEAST ONE MOBILE TERMINAL

(71) Applicant: SIVANTOS PTE. LTD., Singapore (SG)

(72) Inventors: Arthur Giesner, Heroldsberg (DE); Robert Baeuml, Eckental (DE); Gunter Sauer, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 15/268,778

(22) Filed: Sep. 19, 2016

(65) Prior Publication Data

US 2017/0085695 A1    Mar. 23, 2017

(30) Foreign Application Priority Data

Sep. 18, 2015   (DE) .................. 10 2015 217 982

(51) Int. Cl.
*H04B 1/38*    (2015.01)
*H04R 5/00*    (2006.01)
(Continued)

(52) U.S. Cl.
CPC ........ *H04M 1/7253* (2013.01); *H04R 25/552* (2013.01); *H04W 4/005* (2013.01);
(Continued)

(58) Field of Classification Search
CPC ..... H04W 4/005; H04W 4/008; H04W 84/12; H04W 84/20; H04M 1/7253; H04R 25/552; H04R 25/554; H04R 2225/55
(Continued)

(56) References Cited

U.S. PATENT DOCUMENTS 6,931,141 B2 * 8/2005 Moller ................. H04R 25/556
381/314
8,379,889 B2    2/2013 Feilner et al.
(Continued)

FOREIGN PATENT DOCUMENTS

EP       2712211 A1    3/2014
WO    2008031901 A1    3/2008
WO    2015018456 A1    2/2015

*Primary Examiner* — Quochien B Vuong
(74) *Attorney, Agent, or Firm* — Laurence A. Greenberg; Werner H. Stemer; Ralph E. Locher

(57) ABSTRACT

A method selects a communication status for a first mobile terminal. The first mobile terminal assumes a "slave" status during a first time period and waits to see whether, by a communication request from another mobile terminal to the first mobile terminal, a connection is set up to the other mobile terminal. If a connection is set up, the first mobile terminal constantly assumes the "slave" status and the other mobile terminal constantly assumes a "master" status. After the first time period without a communication request from another mobile terminal, the first mobile terminal switches from the "slave" status to the "master" status for a second time period and sends a number of communication requests to set up a connection to another mobile terminal and, if a connection is set up in this way, constantly assumes the "master" status and the other mobile terminal constantly assumes the "slave" status.

8 Claims, 1 Drawing Sheet

(51) Int. Cl.
*H04R 25/00* (2006.01)
*H04M 1/725* (2006.01)
*H04W 4/00* (2018.01)
*H04W 84/20* (2009.01)
*H04W 76/02* (2009.01)

(52) U.S. Cl.
CPC ........... *H04W 84/20* (2013.01); *H04R 25/554* (2013.01); *H04W 4/008* (2013.01); *H04W 76/02* (2013.01)

(58) Field of Classification Search
USPC ................ 455/41.1, 41.2, 557, 569.1, 575.2; 381/23.1, 312, 315, 320
See application file for complete search history.

(56) References Cited

U.S. PATENT DOCUMENTS

| | | | |
|---|---|---|---|
| 8,521,200 B2* | 8/2013 | Sattele | H04L 12/40032 370/329 |
| 8,571,241 B2* | 10/2013 | Larsen | H04R 25/554 381/315 |
| 8,831,508 B2* | 9/2014 | Rasmussen | H04R 25/552 370/506 |
| 9,137,613 B2* | 9/2015 | El-Hoiydi | H04B 7/0667 |
| 9,247,355 B2* | 1/2016 | El-Hoiydi | H04R 25/558 |
| 2002/0076073 A1 | 6/2002 | Taenzer et al. | |
| 2007/0009124 A1 | 1/2007 | Larsen | |
| 2008/0240145 A1 | 10/2008 | Adamovsky et al. | |
| 2009/0154742 A1 | 6/2009 | Rasmussen | |
| 2010/0291955 A1 | 11/2010 | Saettele | |
| 2011/0033071 A1 | 2/2011 | Larsen | |
| 2011/0051743 A1* | 3/2011 | Chen | H04W 74/06 370/449 |
| 2011/0085687 A1 | 4/2011 | Edgar | |
| 2011/0249836 A1 | 10/2011 | Solum et al. | |
| 2014/0086417 A1 | 3/2014 | Hansen et al. | |
| 2015/0312685 A1* | 10/2015 | Huettinger | H04R 25/55 381/315 |
| 2016/0157026 A1 | 6/2016 | Guindi et al. | |

* cited by examiner

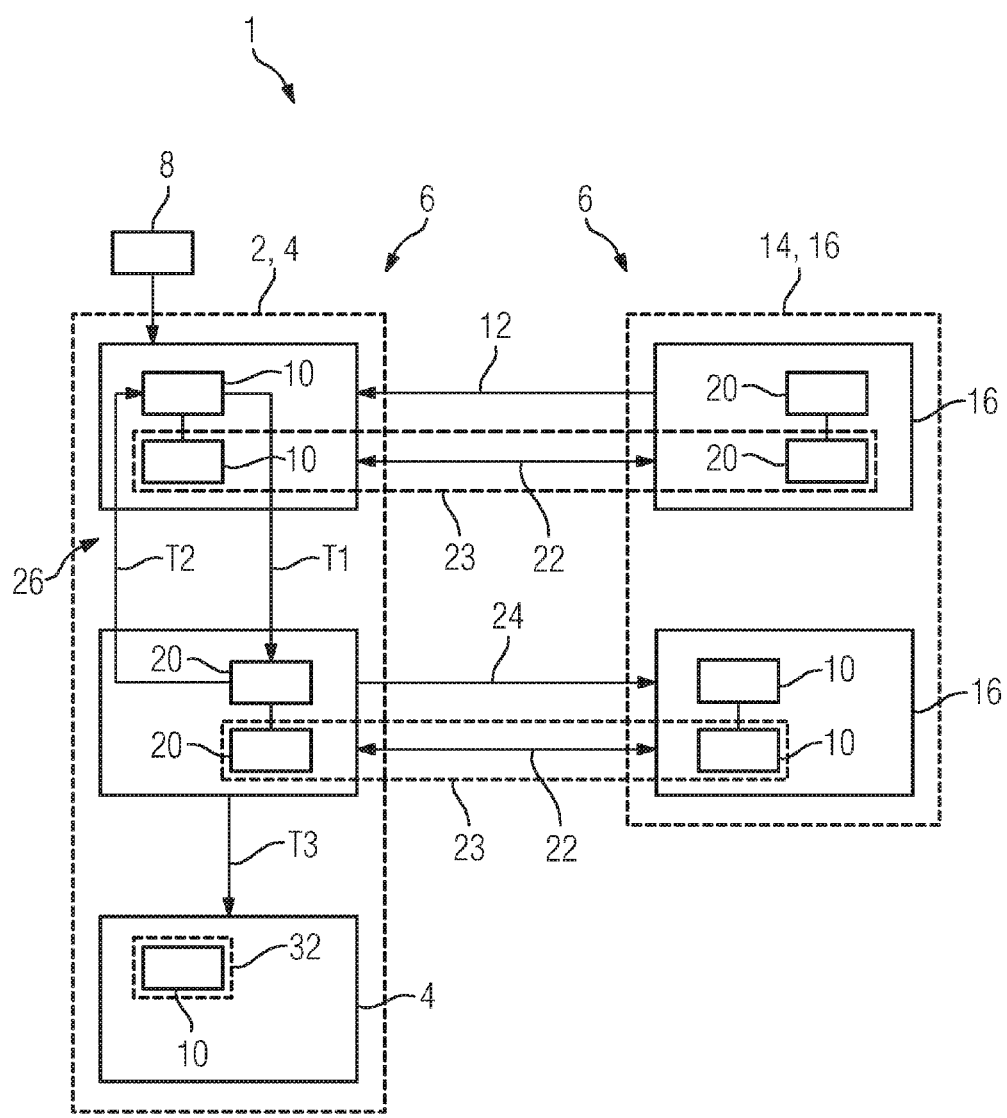

METHOD AND SYSTEM FOR SELECTING A COMMUNICATION STATUS FOR AT LEAST ONE MOBILE TERMINAL

CROSS-REFERENCE TO RELATED APPLICATION

This application claims the priority, under 35 U.S.C. § 119, of German application DE 10 2015 217 982.6, filed Sep. 18, 2015; the prior application is herewith incorporated by reference in its entirety.

BACKGROUND OF THE INVENTION

Field of the Invention

The invention relates to a method for selecting a communication status for at least one first mobile terminal, wherein, as a result of the method, the first mobile terminal constantly assumes a "slave" status or constantly assumes a "master" status.

In a wireless network for communication between a plurality of mobile terminals, the need may arise, depending on the communication protocol that is to be used, to allocate a "master" status to one mobile terminal and to operate the other participating mobile terminals in the "slave" status in relation to the communication.

This is particularly the case where the individual mobile terminals jointly use a channel for communication in which the simultaneous transmission of messages that are sent from a plurality of different mobile terminals of the network is not provided or is not possible for technical reasons. For example, the bandwidth for transmission in one channel may be limited so that it does not interfere with other communication not originating from the network concerned. This may, however, have the consequence that the simultaneous transmission of messages by a plurality of mobile terminals of the network for its part similarly results in interference.

This is usually avoided in that one of the mobile terminals as the "master" can have use of the channel for the communication by the other mobile terminals which in each case wait accordingly as "slaves" for a communication request from the master and transmit their data accordingly only in response to such a request. This transmission usually takes place to the master, which can forward the data if necessary to the intended slave.

For successful communication, network architecture of this type requires the presence of a master-slave relationship between the individual mobile terminals of the network. Such a relationship can be statically predefined depending on the network type, if it is to be expected that one of the mobile terminals transmits significantly more data to the other mobile terminals in the network than the others, such as, for example, in the wireless connection of a loudspeaker to a laptop for streaming music, wherein the laptop is usually operated as the master and the loudspeaker as the slave.

However, a static allocation is often inappropriate, particularly in the case of devices that are of the same type and are equivalent in terms of communication. This may occur, for example, in the case of the two hearing aids of a binaural hearing aid system or the individual headsets of a mobile communication system of the type used partially to set up and run major events. In a system of this type, on the one hand, no natural hierarchy exists in respect of the communication in the network; furthermore, it is not possible to define from the outset whether and when a further mobile terminal is present at all in the network.

SUMMARY OF THE INVENTION

The object of the invention is therefore to indicate a method by which a hierarchical communication status can be dynamically selected and allocated in the simplest and most reliable manner possible for at least one mobile terminal.

The aforementioned object is achieved according to the invention by a method for selecting a communication status for at least one first mobile terminal, wherein it is provided that the first mobile terminal assumes a slave status during a first time period and waits to see whether, by means of a communication request from another mobile terminal to the first mobile terminal, a connection is set up to the other terminal and, if a connection is set up in this way, constantly assumes the slave status and the other mobile terminal constantly assumes a master status, It is furthermore provided that, after the first time period without a communication request from another mobile terminal, the first mobile terminal switches for a second time period from the slave status to the master status and sends a number of communication requests to set up a connection to another mobile terminal and, if a connection is set up in this way, constantly assumes the master status and the other mobile terminal constantly assumes the slave status. Advantageous designs, in some cases inventive in themselves, are described in the sub claims and in the following description.

A mobile terminal is understood here to mean any mobile device which is configured for wireless communication with at least one other device in a network. A constant assumption of the master status or slave status means here, in particular, that the communication status concerned is assumed for a time period which is considerably greater than the first time period and the second time period.

The master status is characterized here, in particular, in that, following the set-up of a connection to at least one further mobile terminal, the mobile terminal which assumes the master status, by sending communication requests, in each case requests the transmission of data by the further mobile terminal to which the communication request has been sent. Conversely, the slave status is, in particular, characterized in that, following the set-up of a connection, a mobile terminal which assumes the slave status transmits data only in response to a communication request from a further mobile terminal which assumes the master status. Here, a communication request in each case means, on the one hand, a communication request which is sent specifically and only for the purpose of a connection set-up, and also a direct request intended for the transmission of data.

The starting point of the method here is the consideration of allocating the corresponding communication status, i.e. master or slave, to at least the first mobile terminal for communication with at least one other mobile terminal. The first mobile terminal to which the communication status is to be allocated by the method is intended, inter alia, to be designed also for an operation which can be interrupted by lengthy operational pauses so that the allocation of a communication status has to take account of an operating behavior of this type. The mobility of the first mobile terminal and further mobile terminals in terms of integration into a network must similarly be taken into account.

Given the fact that, during a commissioning of the first mobile terminal, no information is yet available relating to the current existence or even the architecture of a corresponding network consisting of other mobile terminals, an allocation of the communication status must be performed in a correspondingly dynamic manner. This is preferably carried out during an initial commissioning of the first mobile terminal or a recommissioning of the communication following one of the aforementioned operational pauses. In particular, during a commissioning or in the event of a change in the spatial environment of the first mobile terminal, the method is therefore carried out locally in order to select a communication status for the first mobile terminal for communication in a network.

It is now recognized that, in the event of a required initiation of communication by the first mobile terminal, an existing hierarchy in a possibly already existing network is best respected in that the first mobile terminal initially temporarily assumes the slave status and waits for a communication request from another mobile terminal. If the first mobile terminal itself initially assumes the master status at least temporarily and sends communication requests, this would have the advantage, where relevant, in a network that does not yet exist, of enabling a hierarchy to be set up more quickly, but with the detrimental effect that, in the case of a network that already exists with another mobile terminal which itself sends communication requests in an at least temporary master status, this could result in interference in the channel and thereby in malfunctions and instabilities.

If a communication request is then received from another mobile terminal, the first mobile terminal recognizes the existence of a network which contains at least the other mobile terminal from which the communication request was sent, and therefore the existence of a corresponding hierarchy. A connection can be set up by the communication request from the other mobile terminal to the first mobile terminal, wherein the first mobile terminal assumes the slave status for the further progress of the communication, wherein the other mobile terminal which sent the communication request continues to remain in the master status and henceforth controls the transmission by the first mobile terminal accordingly by sending communication requests.

However, in the absence of a communication request of this type for a first time period which is preferably to be selected appropriately taking account of the time duration of the communication request, the first mobile terminal infers that no other mobile terminal is operating in master mode in its environment, and therefore also that no network yet exists. This may be the case, on the one hand, since no further mobile terminal at all is located in the environment, or other mobile terminals, if they are operational at all in the environment, are themselves in the slave status and accordingly send no communication requests.

This then authorizes the first mobile terminal itself to switch to the master status at least for a second time period which is to be correspondingly appropriately selected, and itself to send a number, preferably a plurality, of communication requests in this status, ft another mobile terminal is put into operation in the transmission range of the first mobile terminal, it is thus provided that the other mobile terminal itself initially assumes the slave status following commissioning and waits for a communication request in this status. If the first mobile terminal switches to the master mode in this time in which the other mobile terminal is itself waiting in the slave status for a communication request and sends the corresponding communication request, a connection is set up to the other mobile terminal by means of said request. The master-slave relationship between the first and the other mobile terminal is also maintained accordingly for the continuation of the communication. In particular, a communication status is thus selected by the method for the constant status assumption, not only for the first mobile terminal, but also for the other mobile terminal if a connection can be set up successfully between the first mobile terminal and the other mobile terminal.

If an additional further mobile terminal is then put into operation in the transmission range of the at least one mobile terminal, this further mobile terminal also initially assumes the slave status and is integrated into the network by a communication request for the connection set-up from the first mobile terminal which has assumed the master status.

It proves to be advantageous if the first mobile terminal iterates the assumption of the slave status in each case for a first time period and the assumption of the master status in each case for a second time period until a connection is set up to another mobile terminal. This means, in particular, that the first mobile terminal reverts to the slave status after the second time period in the master status if no connection has been set up to another mobile terminal by the communication requests which the first mobile terminal has sent in the master status. The first mobile terminal in turn then waits again in the slave status for a first time period for a communication request that has been sent from another mobile terminal to set up a connection. In the absence of the request, the first mobile terminal again switches to the master status in order to send communication requests itself once more to set up a connection. This is now repeated until the first mobile terminal has successfully set up a connection to another mobile terminal. The first mobile terminal and the other mobile terminal to which the connection is set up are then further operated in each case in the communication status, i.e. master or slave status, which prevails in each case when the connection is successfully set up.

The duration for the first time period and/or the second time period is appropriately predefined in each case randomly or pseudo-randomly. A random or pseudo-random predefinition of the first time period and the second time period is to be understood, in particular, to be a predefinition which, in the broadest sense, uses a table or generator for random numbers or for pseudo-random numbers for the duration of a corresponding time period. In particular, in the case where the first mobile terminal iterates the assumption of the slave status in each case for a first time period and the assumption of the master status in each case for a second time period until a connection is set up to another mobile terminal, the first time period and the second time period are in each case predefined randomly or pseudo-randomly in each iteration step.

If, for example, the first mobile terminal and the other mobile terminal to which the first mobile terminal is intended to set up a connection are put into operation more or less simultaneously in reciprocal transmission range, a static predefinition of the first time period and the second time period could possibly cause both participating mobile terminals to switch more or less synchronously from the slave status to the master status, This could mean that a connection cannot be successfully set up despite the transmission range, since an at least temporary master-slave relationship should preferably exist between the two mobile terminals for this purpose. Since the time durations for the first time period and/or the second time period are in each case predefined randomly or pseudo-randomly, and preferably independently in each mobile terminal, the two mobile terminals are prevented from switching synchronously between the communication statuses, thereby considerably simplifying and speeding up the set-up of a connection.

In one advantageous design of the invention, the first mobile terminal constantly assumes the slave status or an inactive communication status if no connection has been set up to another mobile terminal after a third time period. In the "slave" status, the mobile terminal continues to remain constantly ready to receive communication requests which have been sent from another mobile terminal, whereas, in the inactive communication status, on the other hand, a readiness to receive of the mobile terminal is deactivated, and, in particular, no power is provided for the readiness to receive.

In particular, the third time period has a considerably longer duration here than the first time period and the second time period. If the first mobile terminal, where relevant even after an iteration described above, has received no communication request, and the communication requests sent by the first mobile terminal, where relevant even after an iteration described above, have not resulted in a set-up of a connection to another mobile terminal, a constant absence of a further mobile terminal that is in operation can be inferred after a certain time duration. In this case, the first mobile terminal is operated independently and no further communication requests are henceforth sent. This also has an advantageous effect on energy consumption. Accordingly, the first mobile terminal remains constantly in the slave status or in the inactive communication status after the third time period if no connection has yet been set up.

A connection is favorably set up between the first mobile terminal and another mobile terminal, wherein, if this connection is lost, the first mobile terminal assumes the slave status and iterates the slave status with this master status until a connection to the other mobile terminal is set up once more. To set up the connection, the first mobile terminal waits in the slave status in each case for a communication request from the other mobile terminal and itself sends a number of communication requests in the master status. In particular, the iteration of the slave status with the master status by the first mobile terminal can also continue until a connection is set up to a further mobile terminal to which no connection previously existed. In particular, the slave status is maintained after a third time period in which the first mobile terminal has iterated the slave status with the master status without a connection being able to be set up to the other mobile terminal or to a further mobile terminal. Particularly in the case of wireless communication in a network with mobile terminals, a loss of a connection is possible in principle for technical reasons. If this case occurs, the aforementioned procedure also immediately allows a communication status to be allocated in each case dynamically to the two mobile terminals participating in the connection when the connection is set up once more or, here relevant, a different new connection is set up.

The first mobile terminal advantageously sends the number of communication requests by an inductive transmission. An inductive transmission normally has a comparatively short transmission range. Depending on the frequency and transmitting power, this is between a few centimeters and a few meters. Particularly in a network consisting of mobile terminals which are usually located at such a distance from one another during an intended communication with one another, an inductive transmission has the advantage, due to the short transmission range, of being barely susceptible to interference from other transmission sources not participating in the network. Furthermore, in the case where the distance between the mobile terminals participating or to be participating in the network is within the aforementioned range, in the case of an inductive transmission, comparatively little transmitting power is radiated into far-field areas that are not required, which has a favorable effect on the power consumption of a mobile terminal.

In one further advantageous design of the invention, a first hearing aid of a hearing aid system is used as a first mobile terminal and a second hearing aid of the hearing aid system is used as the other mobile terminal, wherein the first hearing aid constantly assumes the slave status and the second hearing aid constantly assumes the master status, or the first hearing aid constantly assumes the master status and the second hearing aid constantly assumes the slave status and the hearing aid system is thereby used in a binaural operation. This is intended to mean that the two hearing aids of a binaural hearing aid system in each case carry out the method steps for selecting the communication status as the first mobile terminal or the other mobile terminal. As a result, either the first hearing aid is thus operated constantly in the slave status following a connection set-up to the second hearing aid and the second hearing aid is correspondingly operated constantly in the master state, or the first hearing aid is operated constantly in the master status following a connection set-up to the second hearing aid and the second hearing aid is correspondingly operated constantly in the slave status. The corresponding communication statuses are thus allocated for communication in the binaural operation of the hearing aid.

In a binaural hearing aid system, a master-slave relationship is usually set up between the two hearing aids for the transmission of the respective audio data for generating a local ambient sound in each of the two hearing aids. In many binaural hearing aid systems, this master-slave relationship is statically allocated, for example during the fitting process with a hearing-aid technician. However, this static allocation of the communication status to the respective hearing aid has the disadvantage, particularly if one of the two hearing aids fails, e.g. as a result of a defect or during scheduled maintenance, that the functionality of the remaining hearing aid may also be considerably restricted for a monaural operation.

The performance of the method with the two hearing aids of a binaural hearing aid system as respective mobile terminals now has the advantage of allocating a communication status of a master-slave relationship in each case in a simple manner to both hearing aids following a joint commissioning. In particular, if the connection to at least one of the hearing aids is lost, the design also has the advantageous effect of iterating the slave status with the master status—and corresponding behavior in terms of the communication requests—until the connection to the other hearing aid is set up once more and a communication status is thereby also allocated to each of the two hearing aids. The iteration is preferably performed here with random or pseudo-random first and second time periods.

In an alternative, similarly advantageous design, a first hearing aid of a hearing aid system is used as a first mobile terminal, wherein the first hearing aid constantly assumes the slave status or the inactive communication status and the hearing aid system is thereby used in a monaural operation. In particular, this means that the first hearing aid as a first mobile terminal initially waits in the slave status for a communication request from a second hearing aid and, in the absence of such a request, switches to the master status after a first time period in order to send communication requests itself during a second time period to set up a connection to a second hearing aid. The first hearing aid preferably iterates the slave status and the master status in the manner described for a third time period, after which the first hearing aid infers an absence of the second hearing aid and is operated correspondingly monaurally. To do this, it remains constantly in the slave status or in the inactive communication status, which, in particular, has an advantageous effect on energy consumption.

The invention furthermore specifies a hearing aid system with at least one hearing aid, wherein the hearing aid system is configured to carry out the previously described method. The advantages specified for the method and its developments can be transferred here accordingly to the hearing aid system. Other features which are considered as characteristic for the invention are set forth in the appended claims.

Although the invention is illustrated and described herein as embodied in a method for selecting a communication status for at least one mobile terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram showing a sequence of a method for selecting communication statuses for two hearing aids of a binaural hearing aid system following commissioning.

DETAILED DESCRIPTION OF THE INVENTION

Referring now to the single FIGURE of the drawing in detail, there is shown a sequence of a method 1 in a block diagram. A first mobile terminal 2 which is configured as a first hearing aid 4 of a binaural hearing aid system 6 initially assumes a slave status 10 following a commissioning 8. In the slave status 10, the first hearing aid 4 waits for a communication request 12 from another mobile terminal 14 which is configured here as a second hearing aid 16 of the binaural hearing aid system 6. If the second hearing aid 16 sends a communication request 12 to the first hearing aid 4, the second hearing aid 16 is temporarily in a master status 20. In this case, a connection 22 is set up by means of the communication request 12 sent by the second hearing aid 16 to the first hearing aid 4. After a connection 22 is set up, the first hearing aid 4 constantly, i.e., for example, for the duration of the operation until the next deactivation, assumes the slave status 10, whereas the second hearing aid 16 constantly assumes the master status 20. The binaural hearing aid system 6 is henceforth used in binaural operation 23.

However, in the absence of the communication request 12 during a first time period T1 either because the second hearing aid 16 is located outside the transmission range of the first hearing aid 4 or because the second hearing aid 16 has not yet been put into operation, the first hearing aid 4 itself switches from the slave status 10 to the master status 20 and in turn sends communication requests 24 to set up the connection 22 to the second hearing aid 16. The first hearing aid 4 remains in the master status 20 following the set-up of a connection 22 which has been established by a communication request 24 sent from the first hearing aid 4 to the second hearing aid 16. The second hearing aid 16, which is initially operated in the slave status 10 for the successful set-up of the connection 22 by the communication request 24, now remains in the slave status 10 for the remaining operation. Here also, the binaural hearing aid system 6 is henceforth used in binaural operation 23.

However, if a connection 22 is not set up by a communication request 24 sent from the first hearing aid 4 to the second hearing aid 16 during a second time period T2 also, the first hearing aid 4 again reverts to the slave status 10. The first hearing aid then iterates the slave status 10 in which it waits for a communication request 12 from the second hearing aid 16 to set up the connection 22, with the master status 20 in which it itself sends communication requests 24 to the second hearing aid 16 to set up the connection 22. The durations of the respective first time periods T1 in which the first hearing aid 4 remains in the slave status 10, and the respective second time periods T2 in which the first hearing aid 4 remains in the master status 20 can be varied randomly or pseudo-randomly during the iteration 26 in order to prevent a behavior synchronous with the second hearing aid 16 during the switch between the communication statuses 30.

If no connection 22 is set up between the first hearing aid 4 and the second hearing aid 16 even after a third time period T3, which is significantly longer than the first time period T1 and the second time period T2, it is assumed that the second hearing aid 16 is absent or out of service. The binaural hearing aid system 6 is then used accordingly with the first hearing aid 4 only in monaural operation 32. Since the first hearing aid 4 constantly assumes the slave status 10 here for this purpose and thus sends no communication request 24, the battery or accumulator of the first hearing aid can be sparingly used. The battery or accumulator can also be additionally sparingly used here if the first hearing aid 4 switches constantly to an inactive communication status, not described in detail, in which the first hearing aid 4 no longer expects any communication requests 12, so that no more power is consumed for the readiness to receive of the first hearing aid 4.

If the connection 22 between the first hearing aid 4 and the second hearing aid 16 is lost in the meantime in the binaural operation 23 of the binaural hearing aid system 6, for example due to a technical fault in one of the two hearing aids 4, 16 or due to interference with an external signal, the first hearing aid 4 initially begins once more to wait in the slave status 10 for a communication request 12 from the second hearing aid 16 to set up the connection 22 once more, and iterates the slave status 10 with the master status 20 in the manner already described until either the connection 22 is set up once more or the third time period T3 has elapsed.

Although the invention has been illustrated and explained in more detail by means of the preferred example embodiment, the invention is not limited by the disclosed examples, and other variations can be derived herefrom by the person skilled in the art without exceeding the protective scope of the invention.

The following is a summary list of reference numerals and the corresponding structure used in the above description of the invention:

1 Method
2 First mobile terminal
4 First hearing aid
6 Binaural hearing aid system
8 Commissioning
10 Slave status
12 Communication request
14 Other mobile terminal 16 Second hearing aid
20 Master status
22 Connection
23 Binaural operation
24 Communication request
36 Iteration
30 Communication status
32 Monaural operation
T1 First time period
T2 Second time period
T3 third time period

The invention claimed is:

1. A method for selecting a communication status for at least one first mobile terminal, which comprises the steps of:
   assuming a slave status in the first mobile terminal during a first time period;
   waiting to see if, by means of a communication request from a second mobile terminal to the first mobile terminal, a connection is set up to the second mobile terminal, and if the connection is set up, the first mobile terminal constantly assumes the slave status and the second mobile terminal constantly assumes a master status;
   switching the first mobile terminal from the slave status to the master status for a second time period after the first time period expires without the communication request from the second mobile terminal; and
   sending a number of communication requests to set up a connection to the second mobile terminal and, if the connection is set up, the first mobile terminal constantly assumes the master status and the second mobile terminal constantly assumes the slave status;
   wherein the first mobile terminal constantly assumes the slave status or an inactive communication status if no connection is set up to the second mobile terminal after a third time period.

2. The method according to claim 1, wherein the first mobile terminal iterates an assumption of the slave status in each case for the first time period and an assumption of the master status in each case for the second time period until the connection is set up to the second mobile terminal.

3. The method according to claim 1, which further comprises predefining a duration for at least one of the first time period or the second time period in each case randomly or pseudo-randomly.

4. The method according to claim 1, which further comprises setting up the connection between the first mobile terminal and the second mobile terminal, wherein, if the connection is lost, the first mobile terminal assumes the slave status and iterates the slave status with the master status until a new connection is set up once more to the second mobile terminal.

5. The method according to claim 1, which further comprises sending via the first mobile terminal the number of communication requests by means of an inductive transmission.

6. The method according to claim 1, which further comprises:
   providing a first hearing aid of a hearing aid system as the first mobile terminal; and
   providing a second hearing aid of the hearing aid system as the second mobile terminal, and the first hearing aid constantly assumes the slave status and the second hearing aid constantly assumes the master status, or the first hearing aid constantly assumes the master status and the second hearing aid constantly assumes the slave status and the hearing aid system is therefore used in a binaural operation.

7. The method according to claim 1, which further comprises providing a first hearing aid of a hearing aid system as the first mobile terminal, and the first hearing aid constantly assumes the slave status or an inactive communication status and the hearing aid system is thereby used in a monaural operation.

8. A hearing aid system, comprising:
   at least one hearing aid having a processor configured to carry out a method according to claim 1.

* * * * *